United States Patent
Takiguchi et al.

(10) Patent No.: US 10,732,008 B2
(45) Date of Patent: Aug. 4, 2020

(54) POSITION DETECTING DEVICE

(71) Applicant: DENSO CORPORATION, Kariya, Aichi-pref. (JP)

(72) Inventors: Tomoyuki Takiguchi, Kariya (JP); Yoshiyuki Kono, Kariya (JP); Akitoshi Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 11 days.

(21) Appl. No.: 15/441,316

(22) Filed: Feb. 24, 2017

(65) Prior Publication Data
US 2017/0292856 A1    Oct. 12, 2017

(30) Foreign Application Priority Data
Apr. 12, 2016    (JP) .................... 2016-79516

(51) Int. Cl.
  *G01D 5/14*    (2006.01)
  *F02D 9/00*    (2006.01)
  *F16K 37/00*    (2006.01)
  *F16K 31/53*    (2006.01)
  *F16K 1/22*    (2006.01)
  *F02D 9/10*    (2006.01)

(52) U.S. Cl.
  CPC ............. *G01D 5/145* (2013.01); *F02D 9/105* (2013.01); *F16K 1/22* (2013.01); *F16K 31/535* (2013.01); *F16K 37/0033* (2013.01); *F16K 37/0041* (2013.01)

(58) Field of Classification Search
  CPC ........ G01D 5/145; G01D 5/147; F02D 9/105; F16K 37/0041; G01B 7/30; G01B 7/003; G01P 3/487
  See application file for complete search history.

(56) References Cited

U.S. PATENT DOCUMENTS

| | | | |
|---|---|---|---|
| 2007/0188165 A1 | 8/2007 | Kitanaka et al. | |
| 2011/0246133 A1* | 10/2011 | Harada | G01D 5/145 702/151 |
| 2011/0301913 A1* | 12/2011 | Matsumoto | G01D 5/145 702/151 |
| 2015/0116769 A1 | 4/2015 | Nakagawa et al. | |
| 2015/0177025 A1 | 6/2015 | Mizunuma et al. | |
| 2015/0185047 A1* | 7/2015 | Kouno | G01D 5/145 324/251 |

FOREIGN PATENT DOCUMENTS

| JP | S62-095402 A | 5/1987 |
|---|---|---|
| JP | 2002-156204 A | 5/2002 |
| JP | 2007-155617 A | 6/2007 |
| JP | 2007-256122 A | 10/2007 |
| JP | 2015-137554 A | 7/2015 |

\* cited by examiner

*Primary Examiner* — Jermele M Hollington
*Assistant Examiner* — Suresh K Rajaputra

(57) ABSTRACT

The present disclosure provides a rotational angle detecting device. An IC substrate has a flat surface extending along a rotational axis of a throttle valve. Yokes forms, together with the magnets, a closed magnetic circuit. A first Hall element outputs a first signal according to the magnetic flux density in a first direction along the flat surface. A second Hall element outputs a second signal according to the magnetic flux density in a second direction intersecting the flat surface. The first and second Hall elements are positioned within a region that is surrounded by the magnets and the yoke and that is between an edge surface and an edge surface.

14 Claims, 11 Drawing Sheets

FIG. 9
COMPARATIVE EXAMPLE

FIG. 10
COMPARATIVE EXAMPLE

FIG. 11

POSITION DETECTING DEVICE

CROSS REFERENCE TO RELATED APPLICATION

This application is based on reference Japanese Patent Application No. 2016-079516 filed on Apr. 12, 2016, the disclosure of which is incorporated herein by reference.

TECHNICAL FIELD

The present disclosure relates to a position detecting device that detects a rotational angle of a detection object.

BACKGROUND

Conventionally, position detecting devices have been known as devices that detect a rotational angle of a throttle valve of an electronic control throttle device for a vehicle, a rotational angle of an EGR valve of an exhaust gas recirculation valve device, or a rotational angle of an accelerator pedal of an accelerator device. For example, Patent Literature 1 (JP 2007-155617 A) discloses a position detecting device including a magnet, an IC substrate, two vertical Hall elements, and a lateral Hall element. The magnet generates a magnetic field having magnet flux lines in a direction perpendicular to a rotational axis of detection object. The IC substrate has a plate shape and is disposed in the magnetic field. The two vertical Hall elements are disposed in one surface of the IC substrate to detect a magnetic flux in a direction parallel to the one surface. The lateral Hall element detects a magnetic flux in a direction perpendicular to the one surface.

However, in the position detecting device described in Patent Literature 1, the three Hall elements can detect a magnetic field (hereinafter, referred to as "external magnetic field") generated by members other than the magnet. Due to the external magnetic field, accuracy of detecting a rotational angle may be decreased. Furthermore, since the IC substrate is arranged so that the one surface of the IC substrate extends along the magnetic flux lines of the magnetic field formed by the magnet, the size is increased in a direction perpendicular to the rotational axis. As a result, the size of the position detecting device may be increased.

In view of the above, it is an objective of the present disclosure to provide a position detecting device where deterioration of accuracy of detecting a rotational angle due to the external magnetic field can be suppressed while decreasing the size thereof.

SUMMARY

An aspect of the present disclosure a position detecting device including a plurality of magnetic field generators, a yoke, an IC substrate, a first magnetic field detector, and a second magnetic field detector. The position detecting device detects a rotational angle of a detection object. The plurality of magnetic field generators are rotatable together with the detection object. A rotational axis of the detection object is interposed between the plurality of magnetic field generators. The yoke is rotatable together with the detection object. The yoke forms, together with the plurality of magnetic field generators, a closed magnetic circuit that intersects the rotational axis of the detection object. The IC substrate includes one surface and an other surface. The one surface has an area larger than the other surface and extends along the rotational axis. The first magnetic field detector is disposed on the IC substrate and has a magnet sensitive surface to detect a magnetic flux density in a first direction along the one surface. The first magnetic field detector outputs a first signal according to the magnetic flux density in the first direction. The second magnetic field detector is disposed on the IC substrate and has a magnet sensitive surface to detect a magnetic flux density in a second direction intersecting the one surface. The second magnetic field detector outputs a second signal according to the magnetic flux density in the second direction. The first magnetic field detector and the second magnetic field detector are positioned within a region that is surrounded by the plurality of magnetic field generators and the yoke and that is between an edge surface of the plurality of magnetic field generators or the yoke close to the detection object in a direction along the rotational axis and an edge surface of the plurality of magnetic field generators or the yoke away from the detection object in the direction along the rotational axis.

In the aspect of the present disclosure, the first magnetic field detector and the second magnetic field detector are positioned in a region surrounded by the magnetic field generators and the yoke. Thus, generation of a noise due to the external magnetic field can be suppressed when detecting a rotational angle of a detection object. That is, robustness to the external magnetic field can be increased, while suppressing decrease in accuracy of detecting a rotational angle of the detection object.

The one surface of the IC substrate is disposed to extend along the rotational axis of the detection object. Thus, intensity of a magnetic field of the closed magnet circuit passing through the one surface and a direction of the magnetic flux lines of the magnetic field can be detected by the first magnetic field detector having the magnet sensitive surface to detect a magnetic flux density in the first direction along the one surface and the second magnetic field detector having the magnet sensitive surface to detect a magnetic flux density in the second direction intersecting the one surface. Hence, the size can be decreased in a direction perpendicular to the rotational axis of the detection object as compared to a case where the one surface is disposed to intersect the rotational axis of the detection object. That is, the size of the yoke surrounding the first and second magnetic field detectors can be decreased, and thus the size of the position detecting device is also decreased.

Furthermore, since the size of the yoke is decreased, the intensity of the magnet field formed by the magnetic field generators along the rotational axis is relatively increased. As a result, the intensity of the magnetic field with respect to the rotational angle of the detection object and change in the direction of the magnetic flux lines of the magnetic field are increased, whereby accuracy of detecting the rotational angle of the detection object can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Next, a plurality of embodiments of the present disclosure will be described with reference to drawings. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

With reference to FIGS. 1 to 4, a position detecting device according to the first embodiment will described below. A rotational angle detecting device 1 as the "position detecting device" is used in an electronic control throttle device 60 that controls an intake air amount supplied to an engine for a vehicle.

Figure 1:
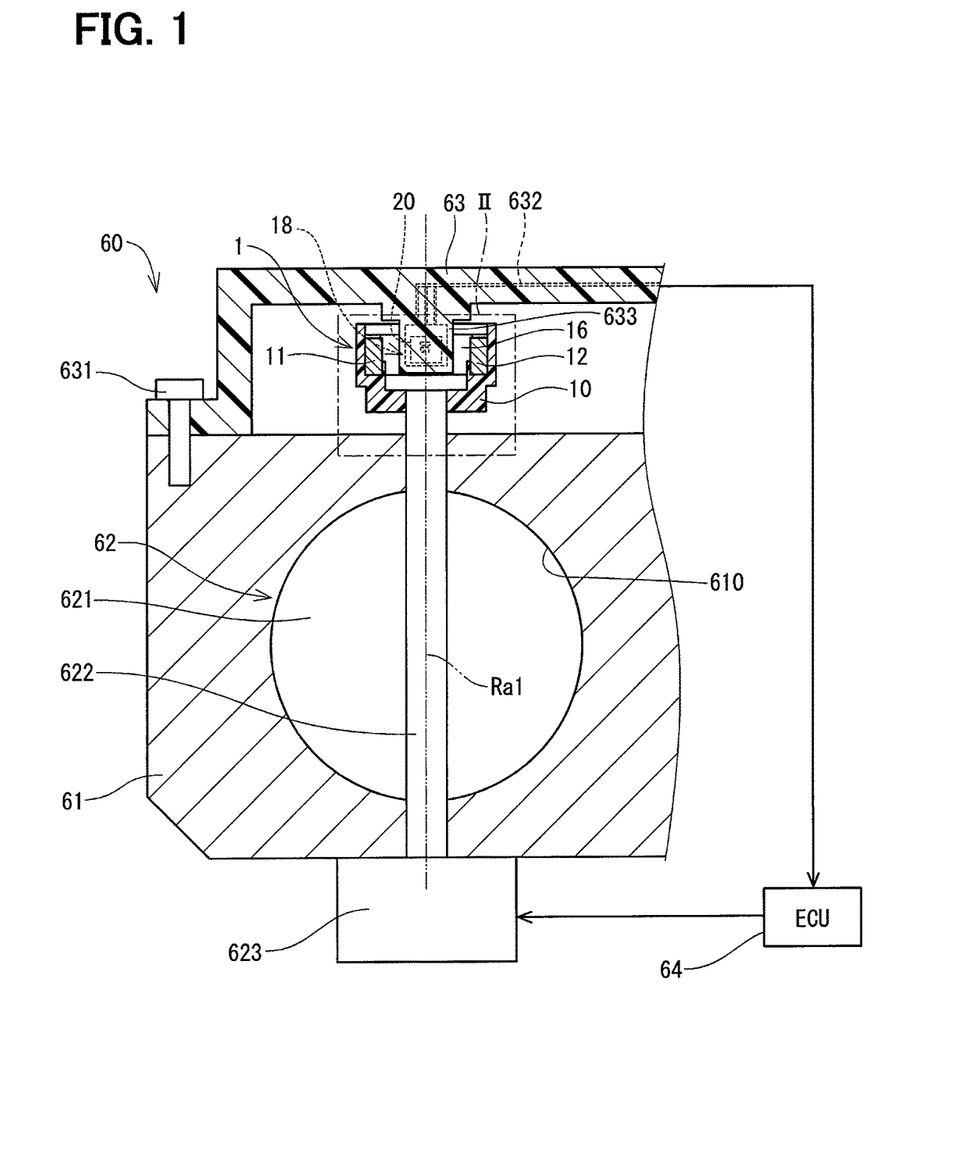
FIG. 1 is a cross-sectional view of an electronic control throttle device to which a position detecting device according to a first embodiment is applied.

Initially, a schematic configuration of the electronic control throttle device 60 will be described. The electronic control throttle valve 60 includes a housing 61, a throttle valve 62 as a "detection object", a housing cover 63, a rotational angle detecting device 1, an ECU 64, and so on, as shown in FIG. 1.

The housing 61 includes an intake passage 610 to introduce an air into the engine. The throttle valve 62 is disposed in the intake passage 610.

The throttle valve 62 includes a valve member 621 and a valve shaft 622. The valve member 621 is formed into substantially a disc shape having an outer diameter that is slightly less than an inner diameter of the intake passage 610. The valve member 621 is fixed to the valve shaft 622. The both ends of the valve shaft 622 are rotatably supported by the housing 61. Accordingly, the throttle valve 62 is configured to be rotatable about a center of the valve shaft 622 as a rotational axis.

A motor 623 is disposed in one end of the valve shaft 622. The motor 623 is controlled based on commands from the ECU 64 for the engine. The opening degree of the throttle valve 62 is controlled by a driving force of the motor 623 and thereby adjusting an intake air amount to be supplied to the engine.

The housing cover 63 is formed of resin and is substantially saucer-shaped. The housing cover 63 is fixed to one side of the housing 61 by a screw 631. The one side of the housing 61 is a side from which one end of the valve shaft 622 protrudes. A wiring 632 that is electrically connected to the rotational angle detecting device 1 is fixed to the housing cover 63.

Figure 2:
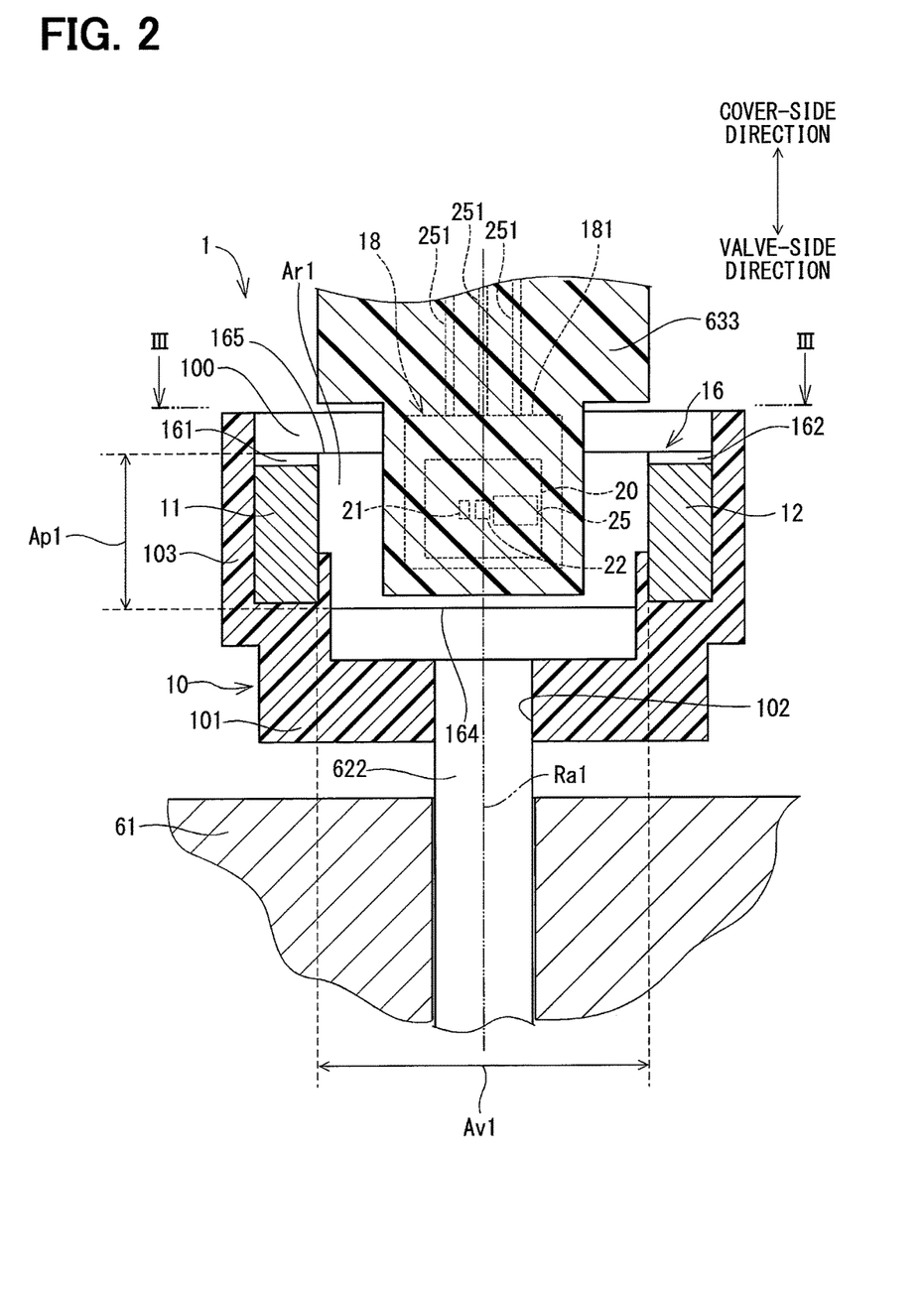
FIG. 2 is an expansion view of a portion indicated by II in FIG. 1.

As shown in FIG. 1, the rotational angle detecting device 1 is disposed between the housing 61 and the housing cover 63. The rotational angle detecting device 1 includes a cylindrical member 10, magnets 11, 12 as "magnetic field generators", yokes 16, 17 as "magnetic circuit generators", and a Hall IC 18, as shown in FIGS. 1 and 2. In FIG. 2, a side at which the housing cover 63 exists is shown as a "cover-side direction", and a side at which the valve member 621 exists is shown in a "valve-side direction".

The cylindrical member 10 is disposed at the other end of the valve shaft 622 and has a cylindrical shape with a bottom. The bottom wall 101 of the cylindrical member 10 defines a through hole 102. The other end of the valve shaft 622 is inserted into the through hole 102. The cylindrical member 10 is fixed relative to the valve shaft 622.

Figure 3:
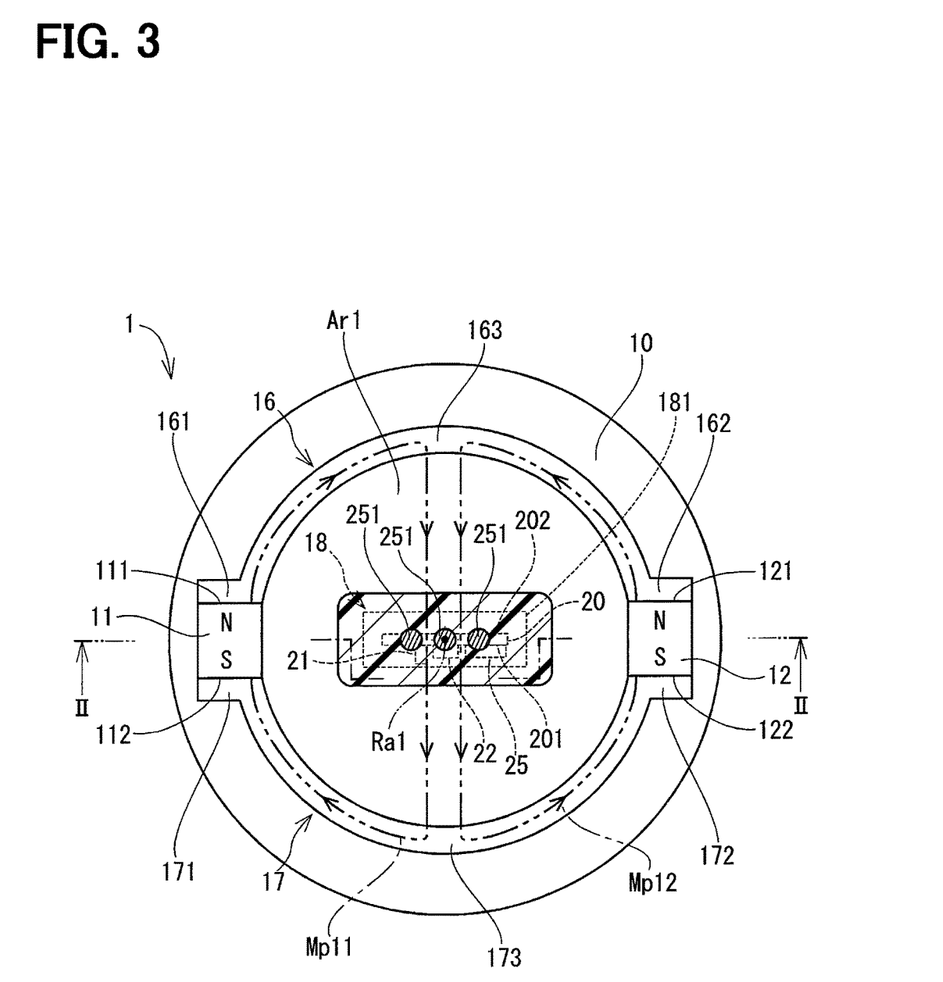
FIG. 3 is a cross-sectional view taken along III-III line in FIG. 2.

The magnets 11, 12 are disposed at an inner wall of a side wall 103 included in the cylindrical member 10, and the rotational shaft Ra1 of the valve shaft 622 is interposed between the magnets 11, 12. The magnets 11, 12 are fixed to the cylindrical member 10 so that the magnets 11, 12 are rotatable together with the throttle valve 62. Each of the magnets 11, 12 has N-pole and S-pole. In FIG. 3, the N-pole of the magnets 11, 12 is shown as "N" and the S-pole of the magnets 11, 12 is shown as "S".

As shown in FIG. 3, each of the yokes 16, 17 has a cross section that is perpendicular to the rotational axis Ra1 and has a semicircular shape. The yokes 16, 17 are disposed at an inner wall of the cylindrical member 10 to have the rotational axis Ra1 of the valve shaft 622 interposed therebetween.

The yoke 16 is disposed to be in contact with an end surface 111 of the magnet 11 at the N-pole side and an end surface 121 of the magnet 12 at the N-pole side. The yoke 16 includes two contact portions 161, 162 and an arc portion 163.

The contact portion 161 is disposed at one end of the yoke 16 and has a width greater than that of the arc portion 163. The contact portion 161 is in contact with the end surface 111 of the magnet 11. The contact portion 162 is disposed at the other end of the yoke 16 and has a width greater than that of the arc portion 163. The contact portion 162 is in contact with the end surface 121 of the magnet 12. The contact portions 161, 162 cause stability of the yoke 16 to increase with respect to the magnets 11, 12 with which the contact portions 161, 162 are in contact. Furthermore, the contact portions 161, 162 can introduce relatively more magnetic flux lines of the magnetic field generated by the magnets 11, 12.

The arc portion 163 is disposed to connect between the contact portion 161 and the contact portion 162 around the rotational axis Ra1 (i.e., at a positon radially outward of the rotational axis Ra1).

The yoke 17 is disposed to connect an end surface 112 of the magnet 11 at the S-pole side to an end surface 122 of the magnet 12 at the S-pole side. The yoke 17 includes two contact portions 171, 172 and an arc portion 173.

The contact portion 171 is disposed at one end of the yoke 17 and has a width less than that of the arc portion 173. The contact portion 171 is in contact with the end surface 112 of the magnet 11. The contact portion 172 is disposed at the other end of the yoke 17 and has a width greater than that of the arc portion 173. The contact portion 172 is in contact with the end surface 122 of the magnet 12. The contact portions 171, 172 cause stability of the yoke 17 to increase with respect to the magnets 11, 12 with which the contact portions 171, 172 are in contact. Furthermore, the contact portions 171, 172 can introduce relatively more magnetic flux lines of the magnetic field generated by the magnets 11, 12.

The arc portion 173 is disposed to connect between the contact portion 171 and the contact portion 172.

As shown in FIG. 3, the magnet 11 forms a closed magnetic circuit Mp11 together with the contact portion 161 of the yoke 16, a portion of the arc portion 163 close to the contact portion 161, the contact portion 171 of the yoke 17, and a portion of the arc portion 173 close to the contact portion 171.

As shown in FIG. 3, the magnet 12 forms a closed magnetic circuit Mp12 together with the contact portion 162 of the yoke 16, a portion of the arc portion 163 close to the contact portion 162, the contact portion 172 of the yoke 17, and a portion of the arc portion 173 close to the contact portion 172.

As a result, the closed circuits MpP11, Mp12 are formed inside an inner space 100 of the cylindrical member 10 in a direction intersecting the rotational axis Ra1.

The Hall IC 18 includes an IC substrate 20, a first Hall element 21 as a "first magnetic field detector", a second Hall element 22 as a "second magnetic field detector", a calculator 25, and a molding resin member 181. The Hall IC 18 is disposed inside a protrusion 633 of the housing cover 63 that is inserted into the inner space 100 of the cylindrical member 10. In the Hall IC 18, the IC substrate 20, the first Hall element 21, the second Hall element 22, and the calculator 25 are sealed by the molding resin member 181. The molding resin member 181 is formed in a flat plate shape along the shape of the IC substrate 20.

The IC substrate 20 is a member having a flat plate shape. The IC substrate 20 includes two flat surfaces 201, 202 that have areas larger than other surfaces of the IC substrate 20. The two flat surfaces 201, 202 are arranged along the rotational axis Ra1. A circuit (not shown) made of a metal film is formed on the flat surface 201 as "one surface" among the two flat surfaces 201, 202.

The first Hall element 21 is mounted on the flat surface 201 of the IC substrate 20. The first Hall element 21 includes a magnet sensitive surface that detects a magnetic flux density in a direction as a "first direction" that is along the flat surface 201 and that is perpendicular to the rotational axis Ra1. That is, the first Hall element 21 is a so-called vertical Hall element. The first Hall element 21 outputs a first signal according to a magnetic flux density detected by the first Hall element 21 to the calculator 25.

The second Hall element 22 is mounted on the flat surface 201 of the IC substrate 20. The second Hall element 22 includes a magnet sensitive surface that detects a magnetic flux density in a direction as a "second direction" that is perpendicular to the flat surface 202 and that is perpendicular to the direction in which the first Hall element 21 detects a magnetic flux density. That is, the second Hall element 22 is a so-called lateral Hall element. The second Hall element 22 outputs a second signal according to a magnetic flux density detected by the second Hall element 22 to the calculator 25.

In the present embodiment, the first and second Hall elements 21, 22 are disposed within a region surrounded by the magnets 11, 12 and the yokes 16, 17 in a direction perpendicular to the rotational axis Ra1. The following is description in detail.

As shown in FIG. 2, the first and second Hall elements 21, 22 are positioned between an edge surface 164 of the yoke 16 and an edge surface 165 of the yoke 16 (see an area indicated by the arrow Ap1 in FIG. 2). The edge surface 164 is a surface of the yoke 16 close to the throttle valve 62 in a direction along the rotational axis Ra1 among the magnets 11, 12 and the yokes 16, 17. The edge surface 165 is a surface of the yoke 16 close to the housing cover 63. Further, as shown in FIG. 2, the first and second Hall elements 21, 22 are positioned closer to the rotational axis Ra1 than inner surfaces of the magnets 11, 12 and the yokes 16, 17 to the rotational axis Ra1 (an area indicated by the arrow Av1 in FIG. 2). That is, the first and second Hall elements 21, 22 are positioned inside an area Ar1 surrounded by the magnets 11, 12 and the yokes 16, 17, as shown in FIGS. 2 and 3. The edge surface 164 may provide "an edge surface of the plurality of magnetic field generators or the yoke close to the detection object in a direction along the rotational axis". The edge surface 165 may provide "edge surface of the plurality of magnetic field generators or the yoke away from the detection object in the direction along the rotational axis".

The calculator 25 is disposed on the flat surface 201 of the IC substrate 20. The calculator 25 is electrically connected to the first Hall element 21 and the second Hall element 22. The calculator 25 calculates a rotational angle of the throttle valve 62 based on the first signal output from the first Hall element 21 and the second signal output from the second Hall element 22.

Figure 4A:
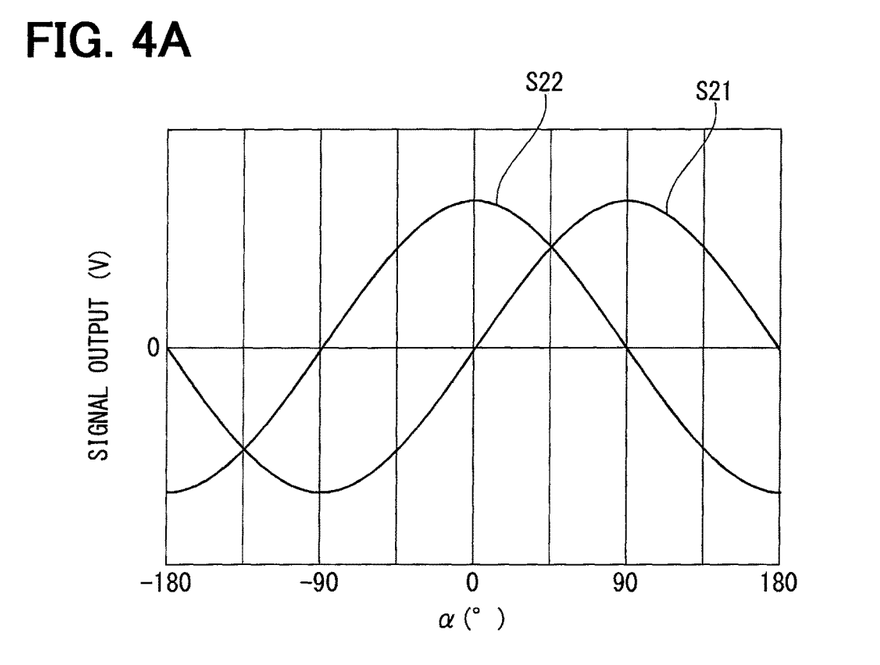
FIG. 4A is a graph showing a relationship between an output signal and a rotational angle of a detection object according to the first embodiment.
Figure 4B:
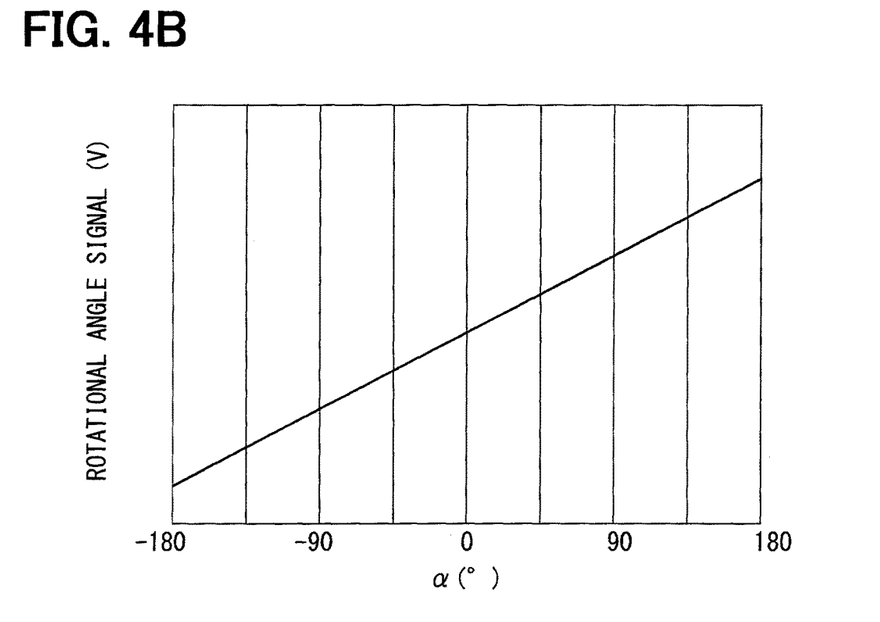
FIG. 4B is a graph showing a relationship between a rotational angle signal and the rotational angle of the detection object according to the first embodiment.

FIGS. 4A and 4B show a method for calculating a rotational angle of the throttle valve 62 by the calculator 25.

FIG. 4A shows a graph of change in the first signal output from the first Hall element 21 and a graph of change in the second signal output from the second Hall element 22 relative to the rotational angle of the throttle valve 62. When the rotational angle of the throttle valve 62 in a state shown in FIG. 3 is defined as 0 degree, the first signal from the first Hall element 21 is represented as a sine wave with respect to the rotational angle of the throttle valve 62 (see the curved line S21 shown in FIG. 4A). Conversely, the second signal from the second Hall element 22 is represented as a cosine curve with respect to the rotational angle of the throttle valve 62 (the curved line S22 shown in FIG. 4A).

The calculator 25 detects the rotational angle of the throttle valve 62 from the value of arctangent of the ratio of the first signal to the second signal (i.e., a value obtained by dividing the first signal by the second signal). The rotational angle is calculated as shown in Table 1 depending on whether the first signal and the second signal have a positive value, a negative value, or 0.

TABLE 1

| Yc | Ys | α (unit: [°]) | range of α (unit: [°]) |
|---|---|---|---|
| Yc < 0 | Ys <= 0 | α = arctan R − 180 | −180 <= α < −90 |
| Yc = 0 | Ys < 0 | α = −90 | |
| Yc > 0 | Ys < 0 | α = arctan R | −90 < α < 0 |
| Yc > 0 | Ys >= 0 | α = arctan R | 0 <= α < 90 |
| Yc = 0 | Ys > 0 | α = −90 | |
| Yc < 0 | Ys > 0 | α = arctan R + 180 | 90 < α < 180 |

Where Ys is the first signal, Yc is the second signal, R is the vale obtained by dividing the first signal Ys by the second signal Yc, α is the rotational angle of the throttle valve 62, R=(Ys/Yc), and −90<arctan R<90.

FIG. 4B shows the calculation result of Table 1 with a rotational signal. In this way, the calculator 25 calculates the rotational angle of the throttle valve 62.

The calculator 25 is electrically connected to terminals 251 as "output terminals" that is formed to extend along the rotational axis Ra1. The calculator 25 outputs the rotational signal corresponding to the rotational angle of the throttle valve 62 to the wiring 632 in the housing cover 63 through the terminals 251. The rotational signal output to the wiring 632 is transmitted to the ECU 64.

In the rotational angle detecting device 1, the first and second Hall elements 21, 22 are positioned between the edge surface 164 and the edge surface 165 of the yoke 16 along the rotational axis Ra1 Further, the first and second Hall elements 21, 22 are positioned closer to the rotational axis Ra1 in the direction perpendicular to the rotational axis Ra1 than the inner walls of the magnets 11, 12 and the yokes 16 are to the rotational axis Ra1. Accordingly, it is possible to suppress a noise due to an external magnetic field generated by members other than the magnets 11, 12 when the first and second Hall elements 21, 22 detect the rotational angle of the throttle valve 62. In other words, robustness of the rotational angle detecting device 1 to the external magnetic field is improved, and therefore it is possible to avoid deteriorating accuracy of detecting the rotational angle of the throttle valve 62.

Figure 9:
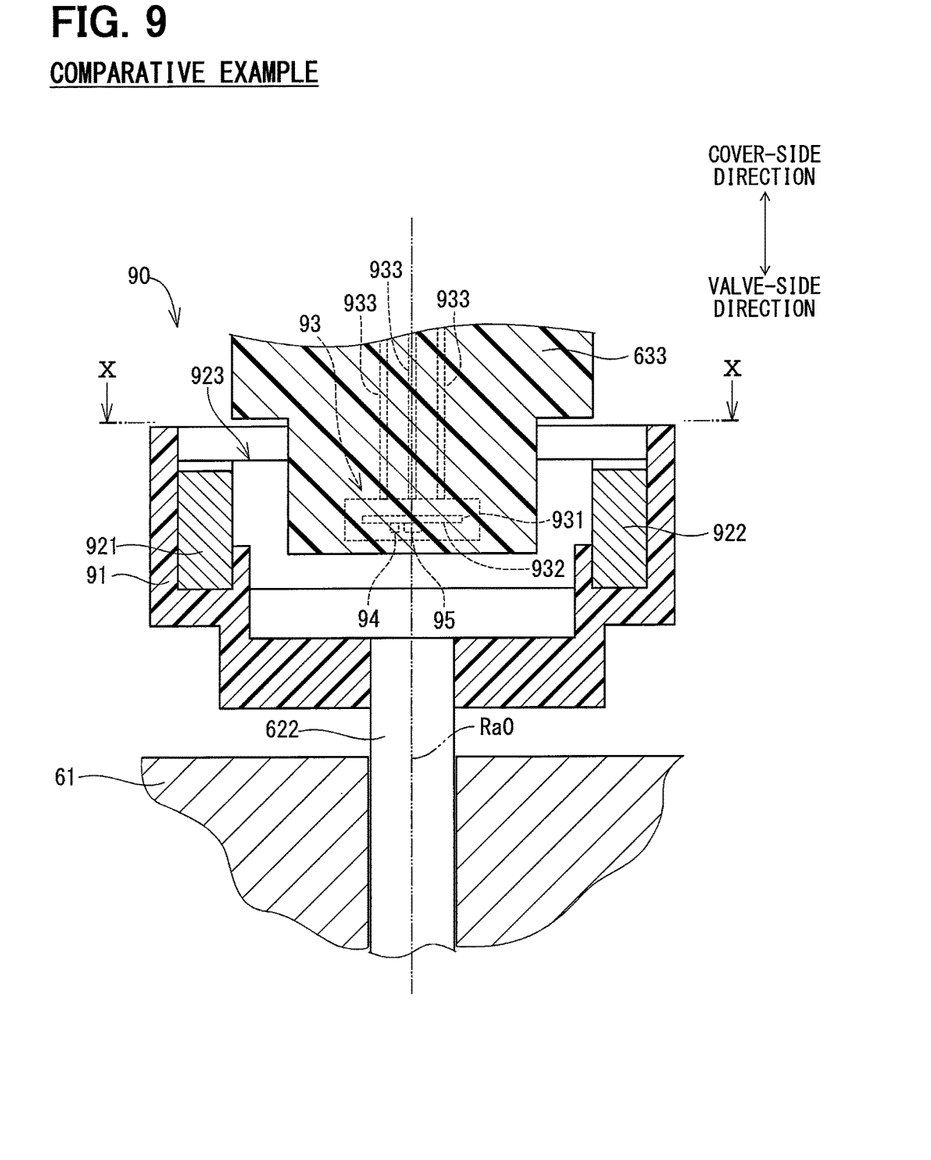
FIG. 9 is a schematic view of a comparative example of a position detecting device.
Figure 10:
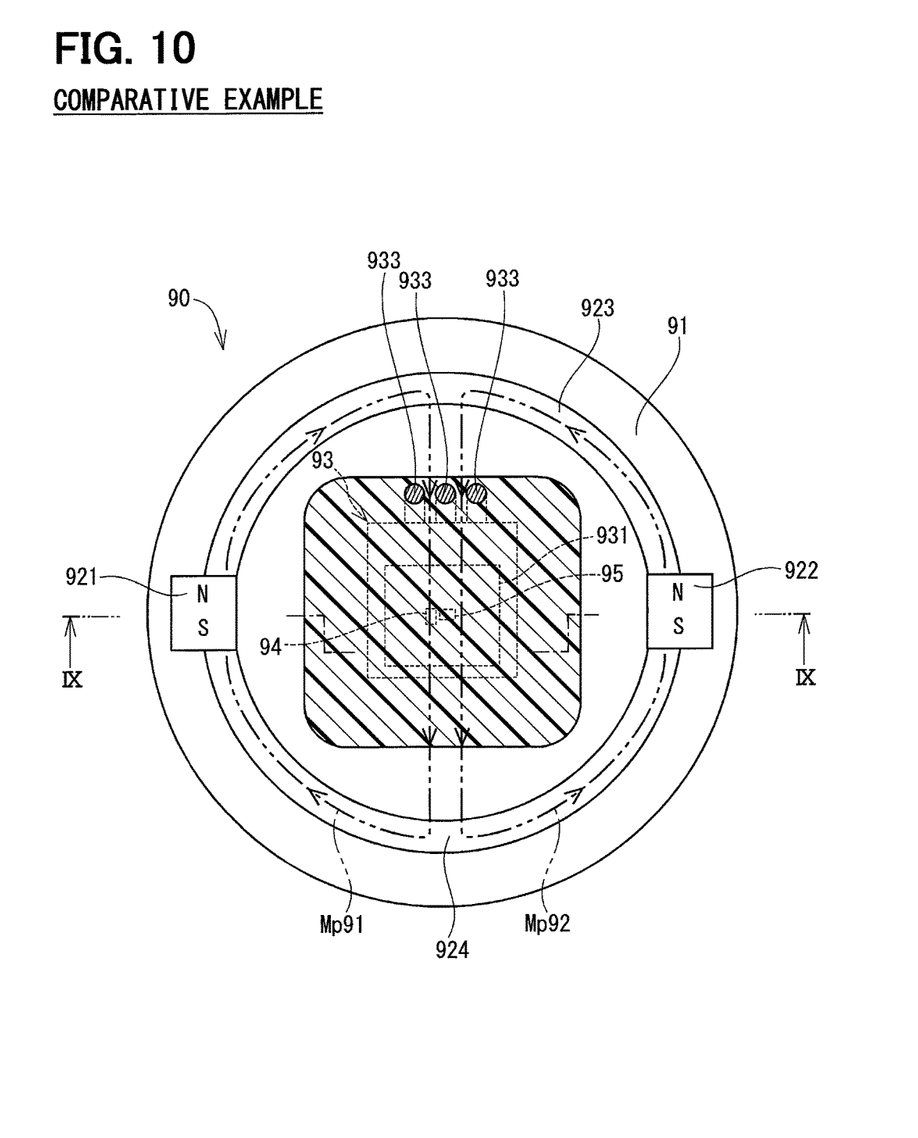
FIG. 10 is a cross-sectional view taken along X-X line in FIG. 9.
Figure 11:
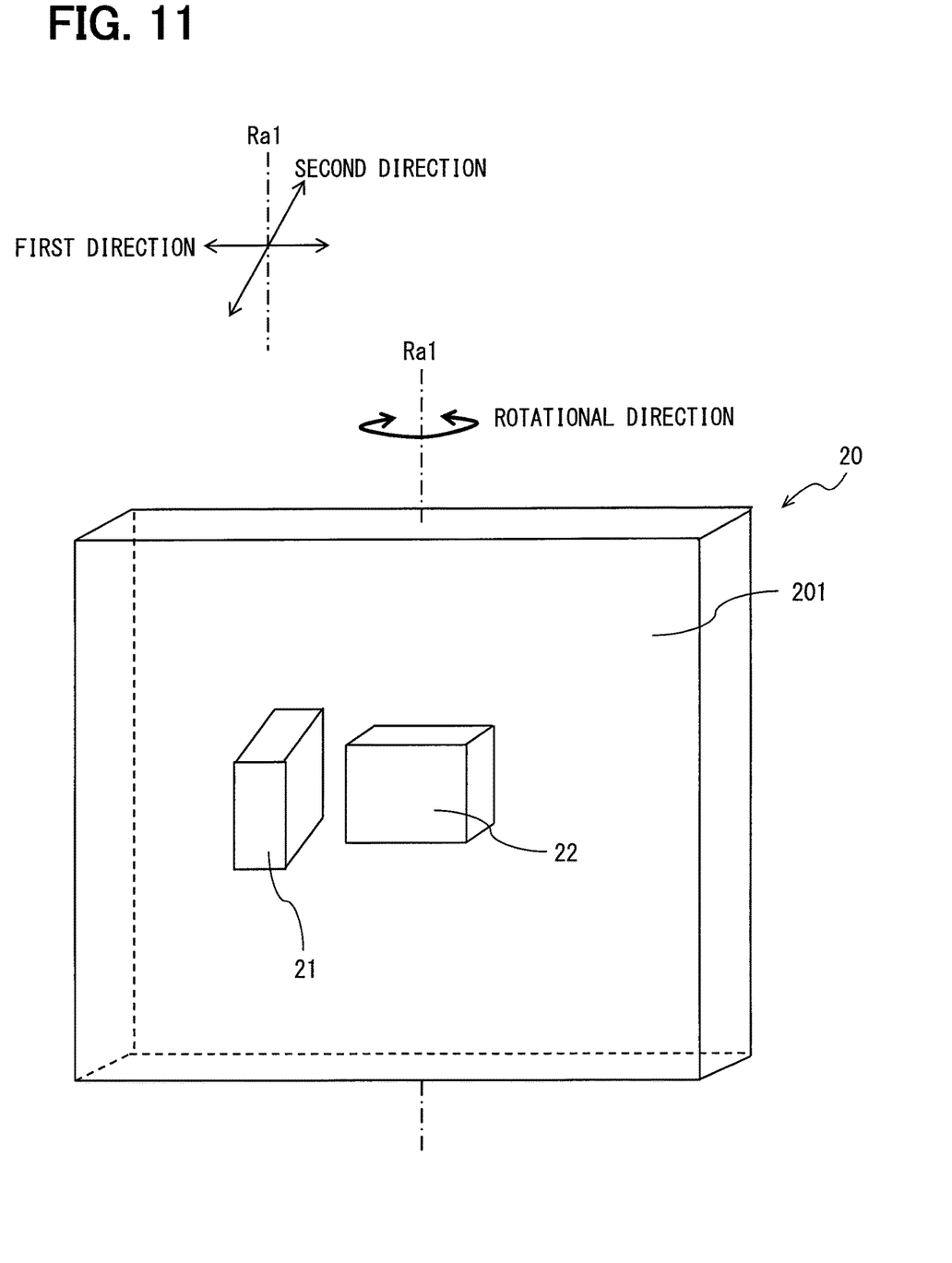

The rotational angle detecting device 1 can decrease in its size. FIGS. 9 and 10 show a comparative example of a rotational angle detecting device (hereinafter, referred to as a "comparative device"). In the comparative device, the Hall IC of the IC substrate is disposed on a flat surface intersecting the rotational axis of the throttle valve.

FIG. 9 shows a cross-sectional view of the comparative device 90 on a flat surface including the rotational axis Ra0 of the throttle valve 62. FIG. 10 shows a perspective view of the comparative device 90 viewed from a direction along the rotational axis Ra0. In FIG. 9, a side at which the housing cover 63 having the protrusion 633 exists is shown as a "cover-side direction", and a side at which the valve member 621 connected to the valve shaft 622 exists is shown as a "valve-side direction", as with the rotational angle detecting device 1 shown in FIG. 2.

The comparative device 90 includes the cylindrical member 90, the magnets 921, 922, the yokes 923, 924, and the Hall IC 93.

As shown in FIG. 9, the IC substrate 931 included in the Hall IC 93 inside the cylindrical member 91 according to the comparative device 90 includes the flat surface 932 on which the two Hall elements 94, 95 are mounted and the flat surface 932 is perpendicular to the rotational axis Ra0. As shown in FIG. 10, the IC substrate 931 is arranged such that the closed magnetic circuits Mp91, Mp92 formed by the magnets 931, 922 and the yokes 923, 924 are in substantially parallel with the flat surface 932. As a result, the size of the cylindrical member 91 becomes relatively large.

In contrast, according to the rotational angle detecting device 1 of the present embodiment, the IC substrate 20 has the flat surface 201 on which the first Hall element 21 and the second hall element 22 are mounted, and the flat surface 201 extends along the rotational axis Ra1 of the throttle valve 62. Accordingly, the Hall element 21, which detects the magnetic flux density in the direction along the flat surface 201, and the second Hall element 22, which detects the magnetic flux density in the direction perpendicular to the flat surface 202, can detect intensity of a magnetic field of the closed magnet circuit and a direction of the magnetic flux lines of the magnetic field. Thus, the size of the yokes 16, 17 can be reduced as compared to the comparative device 90.

Furthermore, in the comparative device 90, the IC substrate 931 is arranged to extend perpendicular to the rotational axis Ra0. Therefore, as shown in FIG. 10, the terminals 933, to which the Hall IC 93 outputs a signal, protrude in a direction perpendicular to the rotational axis Ra0 and then extend in a direction along the rotational axis Ra0. Therefore, the size of the cylindrical member 91 may be further increased.

Conversely, in the rotational angle detecting device 1, each of the terminals 251 extends in the direction along the rotational axis Ra1. Thus, the size of the Hall IC 18 can be decreased, and therefore the size of the rotational angle detecting device 1 can be further decreased.

The rotational angle detecting device 1 calculates the rotational angle of the throttle valve 62 by obtaining the value of arctangent based on the signal output from the first Hall element 21 as the vertical Hall element and the signal output from the second Hall element 22 as the lateral Hall element. Accordingly, the rotational angle of the throttle valve 62 can be detected over 360 degrees by the two Hall elements, as shown in FIGS. 4A and 4B.

In an environment where the electronic control throttle device 60 is used, an environmental temperature can easily fluctuate. Therefore, change in a magnetic field generated by the magnets 11, 12 can be relatively large. In the rotational angle detecting device 1, the first signal from the first Hall element 21 and the second signal from the second Hall element 22 are two variables which can perform a tangent function of the rotational angle of the throttle valve 62. The two variables have one-to-one relationship with the flux component generated by dividing the magnetic flux density of the closed magnet circuit into two directions. Thus, the ratio of the two variables does not vary even when the magnetic flux density varies because of a change in the temperature. Accordingly, the rotational angle of the throttle valve 62 calculated by the rotational angle detecting device 1 can be less likely affected by the environmental temperature. Thus, it is possible to prevent accuracy of detecting the rotational angle of the throttle valve 62 from deteriorating.

In the rotational angle detecting device 1, the first and second Hall elements 21, 22 are mounted on the IC substrate 20. Therefore, the size of the IC substrate 20 can be decreased. Since the calculator 25 is disposed on the IC substrate 20, the size of the rotational angle detecting device 1 can be reduced.

The molding resin member 181 is formed in a flat plate shape to be along the shape of the IC substrate 20. Thus, the size of the molding resin member 181 can be decreased in a direction perpendicular to the rotational axis of the Hall IC 18 as compared to a case where the molding resin member has a relatively larger surface in a direction perpendicular to the rotational axis. Thus, the size of the rotational angle detecting device 1 can be further decreased.

Second Embodiment

Next, the position detecting device according to the second embodiment of the present disclosure will be described with reference to FIG. 5. In the second embodiment, the number of the Hall ICs is different from that of the first embodiment.

Figure 5:
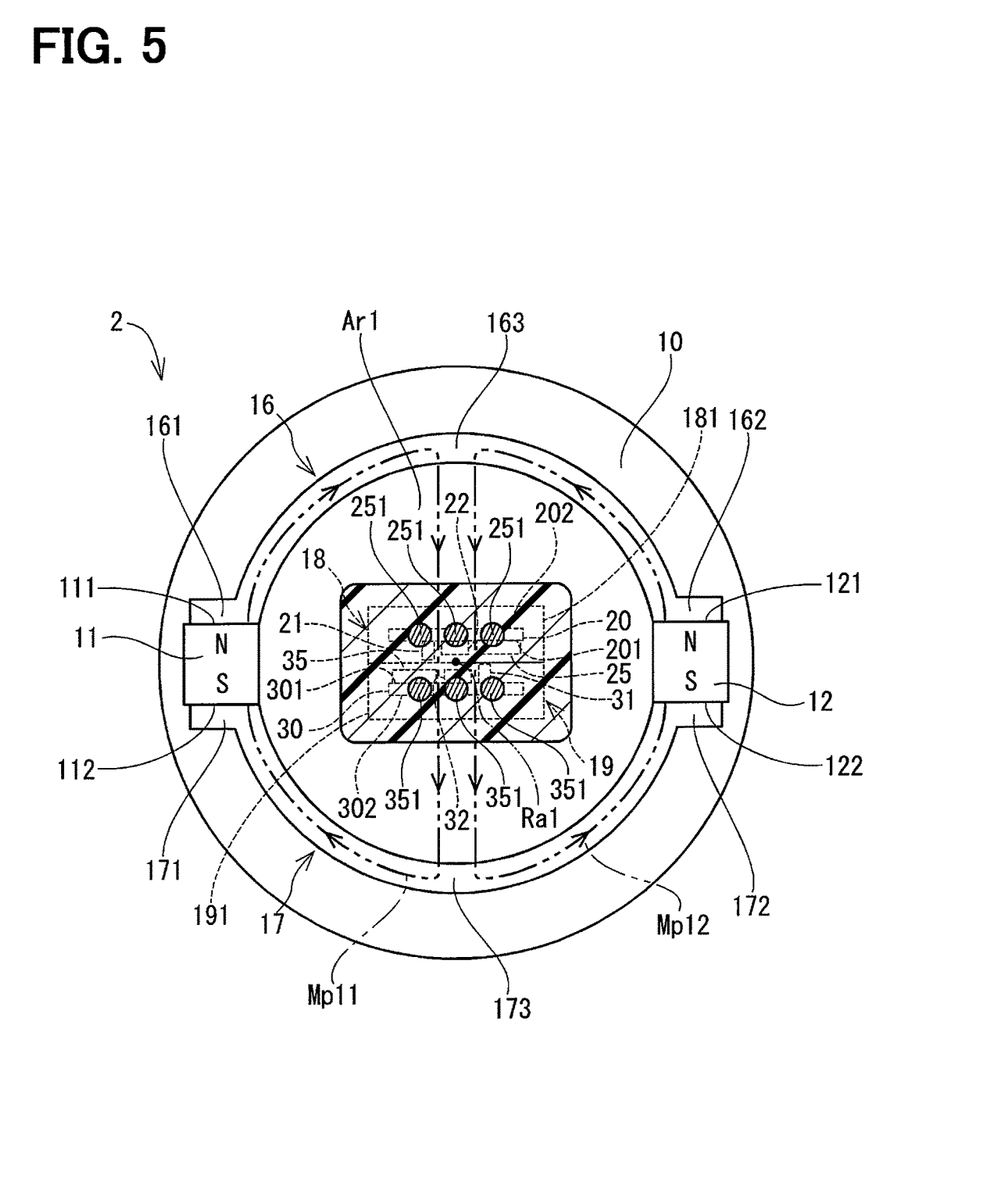
FIG. 5 is a schematic view of the position detecting device according to a second embodiment.

FIG. 5 shows the rotational angle detecting device 2 as the "position detecting device" according to the second embodiment. The rotational angle detecting device 2 includes the cylindrical member 10, the magnets 11, 12, the yokes 16, 17, and the two Hall ICs 18, 19.

The Hall IC 19 includes the IC substrate 30, the first Hall element 31 as the "first magnetic field detector", the second Hall element 32 as the "second magnetic field detector", the calculator 35, and the molding resin member 191. The Hall IC 19 is disposed inside the protrusion 633 of the housing cover 63 together with the Hall IC 18. In the Hall IC 19, the IC substrate 30, the first Hall element 31, the second Hall element 32, and the calculator 35 are sealed by the molding resin member 191. The molding resin member 191 is formed into a flat pale shape along the IC substrate 30.

The IC substrate 30 is a plate shape member. The IC substrate 30 includes two flat surfaces 301, 302 that have areas larger than other surfaces of the IC substrate 30. The two flat surfaces 301, 302 are arranged along the rotational axis Ra1. A circuit (not shown) made of a metal film is formed on the flat surface 301 as "one surface" among the two flat surfaces 301, 302. In the present embodiment, the flat surface 301 is formed to face the flat surface 201 of the IC substrate 20 of the Hall IC 18.

The first Hall element 31 is mounted on the flat surface 301 of the IC substrate 30. The first Hall element 31 includes a magnet sensitive surface that detects a magnetic flux density in a direction as a "first direction" that is along the flat surface 301 and that is perpendicular to the rotational axis Ra1. That is, the first Hall element 31 is a so-called vertical Hall element. The first Hall element 31 outputs a first signal according to a magnetic flux density detected by the first Hall element 31 to the calculator 35.

The second Hall element 32 is mounted on the flat surface 301 of the IC substrate 30. The second Hall element 32 includes a magnet sensitive surface that detects a magnetic flux density in a direction as a "second direction" that is perpendicular to the flat surface 301. That is, the second Hall element 32 is a so-called lateral Hall element. The second Hall element 32 outputs a second signal according to a magnetic flux density detected by the second Hall element 32 to the calculator 35.

In the present embodiment, the first and second Hall elements 31, 32 are positioned within the area Ar1 surrounded by the magnets 11, 12 and the yokes 16, 17 as shown in FIG. 5.

The calculator 35 is disposed on the flat surface 301 of the IC substrate 30. The calculator 35 is electrically connected to the first Hall element 31 and the second Hall element 32. The calculator 35 calculates a rotational angle of the throttle valve 62 by calculating the value of arctangent based on the first signal output from the first Hall element 31 and the second signal output from the second Hall element 32. The calculator 35 outputs a rotational signal corresponding to the rotational angle of the throttle valve 62 to the wiring 632 through the terminals 351 as the "output terminals" that extend along the rotational axis Ra1.

In the rotational angle detecting device 2, the flat surface 201 of the IC substrate 20 included in the Hall IC 18 and the flat surface 301 of the IC substrate 30 included in the Hall IC 19 are arranged to face each other while extending along the rotational axis Ra1. Therefore, the size of the cylindrical member 10 can be decreased. As a result, the rotational angle detecting device 2 can have the same advantages as described in the first embodiment.

Furthermore, the rotational angle detecting device 2 can detect the magnet flux density in a direction along the flat surfaces 201, 301 and the magnet flux density in a direction perpendicular to the flat surfaces 201, 301, in each of the two IC substrates 20, 30. In each of the calculators 25, 35 of the IC substrates 20, 30, the rotational angle of the throttle valve 32 can be calculated. For example, assuming the rotational angle of the throttle valve 62 is normally detected based on a calculation result by one of the IC substrates 20, 30, even if the one of the IC substrates 20, 30 cannot determine the rotational angle of the throttle valve 62 due to occurrence of malfunction, the rotational angle can be still determined based on a calculation result by the other of the IC substrates 20, 30. That is, the rotational angle detecting device 2 according to the present embodiment has double functions to independently detect the rotational angle of the throttle valve 62.

Third Embodiment

Next, the rotational angle detecting device 3 according to the third embodiment will described with reference to FIG. 6. In the third embodiment, the number of the Hall ICs is different from the first embodiment.

Figure 6:
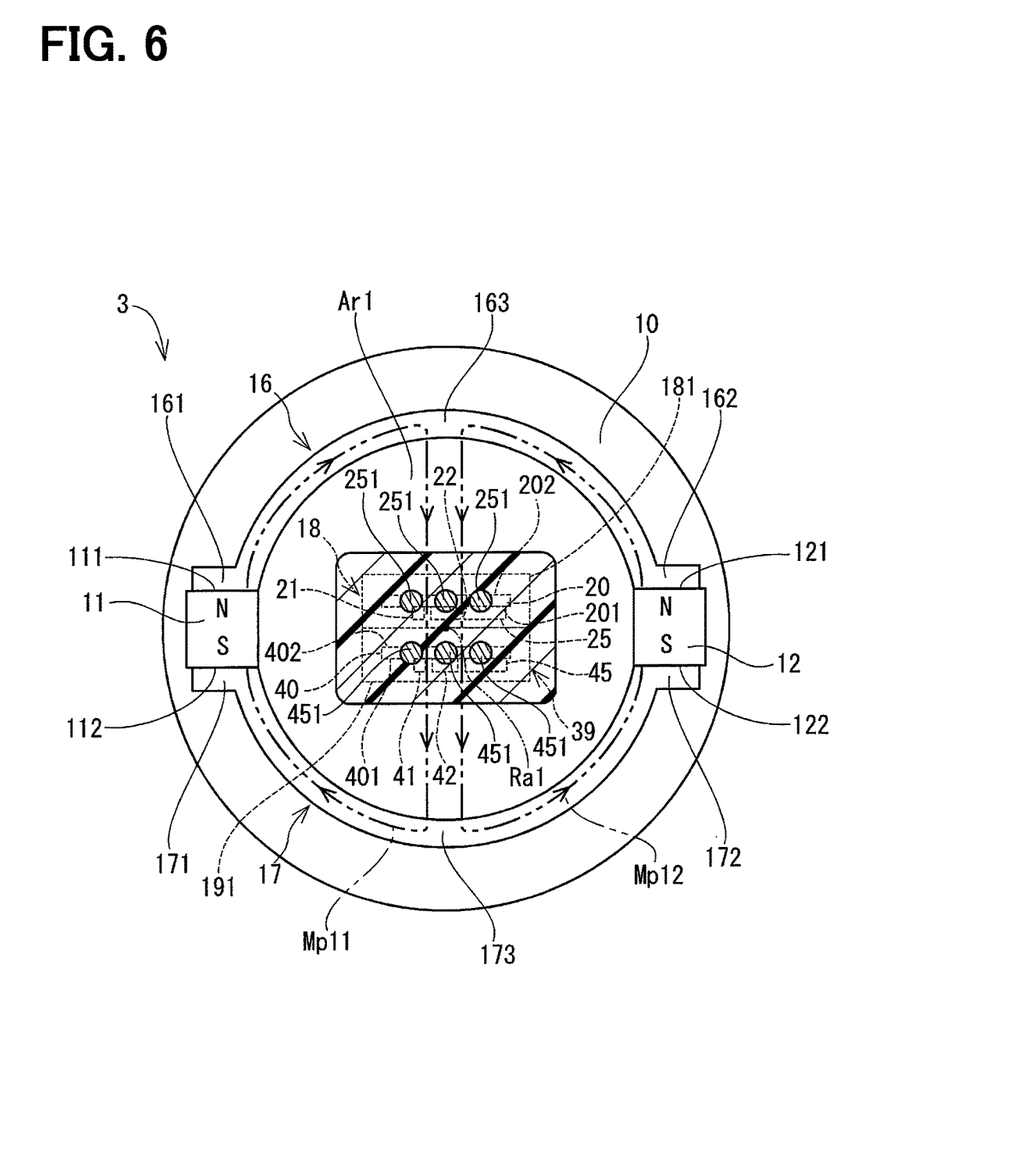
FIG. 6 is a schematic view of the position detecting device according to a third embodiment.

FIG. 6 shows the rotational angle detecting device 3 as the "position detecting device" according to the third embodiment. The rotational angle detecting device 3 includes the cylindrical member 10, the magnets 11, 12, the yokes 16, 17, and the two Hall ICs 18, 39.

The Hall IC 39 includes an IC substrate 40 as an "other IC substrate", a first Hall element 41 as an "other of the first magnetic field detector", a second Hall element 42 as an "other of the second magnetic field detector", the calculator 45, and the molding resin member 391. The Hall IC 39 is disposed inside the protrusion 633 of the housing cover 63 together with the Hall IC 18. In the Hall IC 39, the IC substrate 40, the first Hall element 41, the second Hall element 42, and the calculator 45 are sealed by the molding resin member 391. The molding resin member 391 is formed into a flat plate shape along the IC substrate 40.

The IC substrate 40 is a plate shape member. The IC substrate 40 includes two flat surfaces 401, 402 that have areas larger than other surfaces of the IC substrate 40. The two flat surfaces 401, 402 are arranged along the rotational axis Ra1. A circuit (not shown) made of a metal film is formed on the flat surface 401 as "one surface" among the two flat surfaces 401, 402. In the present embodiment, the flat surface 402 faces the flat surface 201 of the IC substrate 20 of the Hall IC 18.

The first Hall element 41 is mounted on the flat surface 401 of the IC substrate 40. The first Hall element 41 includes a magnet sensitive surface that detects a magnetic flux density in a direction as a "first direction" that is along the flat surface 401. That is, the first Hall element 41 is a so-called vertical Hall element. The first Hall element 41 outputs a first signal according to a magnetic flux density detected by the first Hall element 41 to the calculator 45.

The second Hall element 42 is mounted on the flat surface 401 of the IC substrate 40. The second Hall element 42 includes a magnet sensitive surface that detects a magnetic flux density in a direction as a "second direction" that is perpendicular to the flat surface 402. That is, the second Hall element 42 is a so-called lateral Hall element. The second Hall element 42 outputs a second signal according to a magnetic flux density detected by the second Hall element 42 to the calculator 45.

In the present embodiment, the first and second Hall elements 41, 42 are positioned within the area Ar1 surrounded by the magnets 11, 12 and the yokes 16, 17 as shown in FIG. 6.

The calculator 45 is disposed on the flat surface 401 and is electrically connected to the first Hall element 41 and the second Hall element 42. The calculator 45 calculates a rotational angle of the throttle valve 62 by calculating the value of arctangent based on the first signal output from the first Hall element 41 and the second signal output from the second Hall element 42. The calculator 45 outputs a rotational signal corresponding to the rotational angle of the throttle valve 62 to the wiring 632 through the terminals 451 as the "output terminals" that extend along the rotational axis Ra1.

In the rotational angle detecting device 3, the flat surface 20 of the IC substrate 20 as the "one of the IC substrates" included in the Hall IC 18 and the flat surface 401 of the IC substrate 40 included in the Hall IC 39 are arranged to face in the same direction while extending along the rotational axis Ra1. As a result, the size of the cylindrical member 10 can be decreased. Thus, the rotational angle detecting device 3 can have the same advantages as described in the first embodiment and have double functions to independently detect the rotational angle of the throttle valve 62.

Furthermore, in the rotational angle detecting device 3, the direction in which the first Hall element 21 as the "one of the first elements" can detect the magnetic flux density and the direction in which the first Hall element 41 can detect the magnetic flux density are same. Further, the direction in which the second Hall element 22 as the "one of the second elements" can detect the magnetic flux density and the direction in which the second Hall element 42 can detect the magnetic flux density are same. As a result, the calculators 25, 45 having the Hall ICs 18, 19, respectively, use the same calculation method.

Other Embodiments

In the above-described embodiments, the "position detecting device" is applied to the electronic control throttle device. However, the "position detecting device" of the present disclosure may be applied to other devices.

Figure 7:
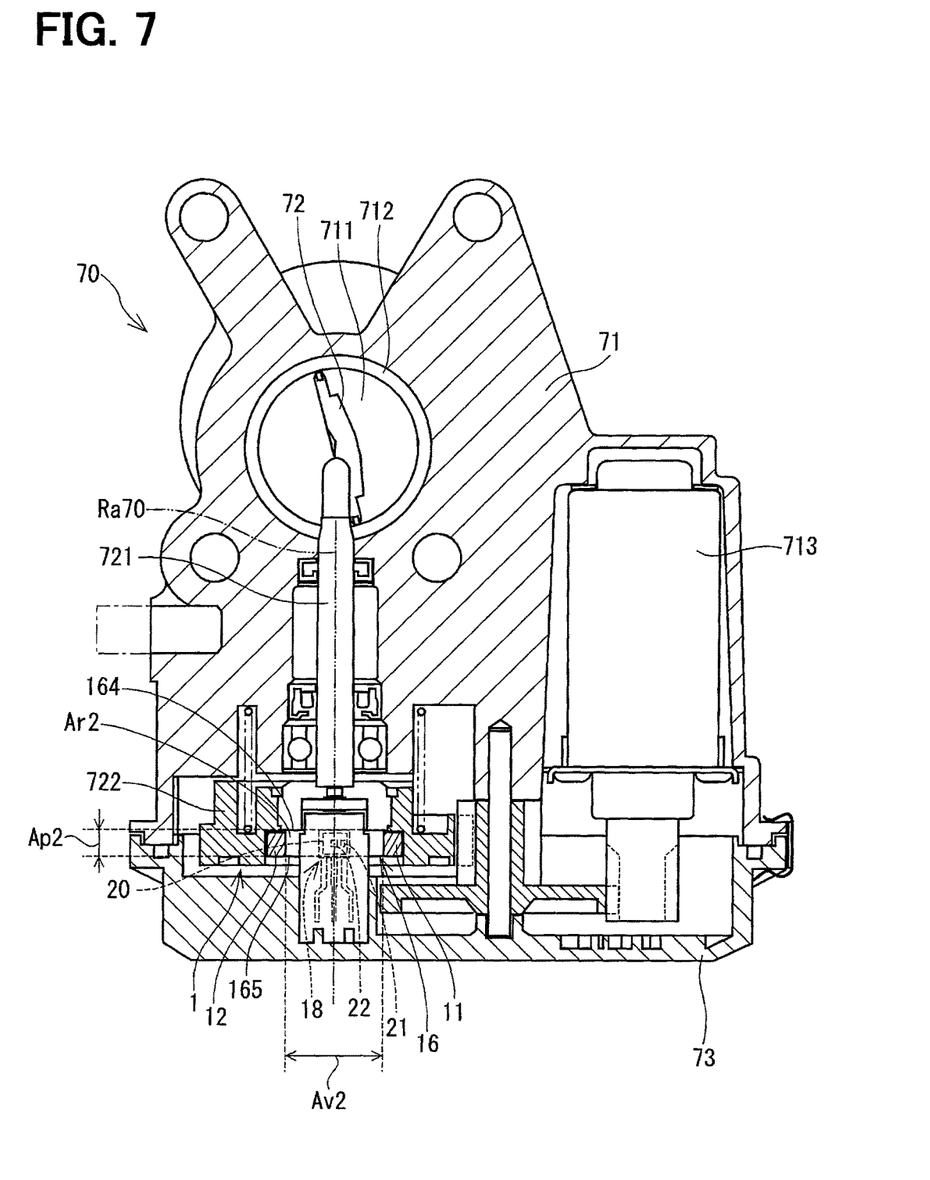
FIG. 7 is a cross-sectional view of an exhaust gas recirculation device in another embodiment to which the position detecting device according to the first embodiment is applied.

FIG. 7 shows a cross-sectional view of an exhaust gas recirculation valve device to which the "position detecting device" according to the first embodiment is applied. The exhaust gas recirculation device 70 shown in FIG. 7 recirculates an EGR gas from an exhaust passage to an intake passage for an engine mounted on a vehicle. The exhaust gas recirculation valve device 70 includes a body 71, an EGR valve 72 as a "detection object" and a "valve member", a sensor case 79, and the rotational angle detecting device 1.

The body 71 includes an EGR passage 711 that recirculates an EGR gas from the exhaust passage to the intake passage. The EGR passage 711 has an inner wall to which a nozzle 12 is fixed. A motor 713 is disposed in the body 71 to rotate the EGR valve 72 for adjusting opening degree of the EGR passage 711.

The EGR valve 72 is rotatably supported by the body 71 through a shaft 721. The EGR valve 72 is a butterfly valve that has a disk shape and adjusts an opening area of the EGR passage 711 according to a rotational angle of the shaft 721. The EGR valve 72 is rotated by rotational torque of the motor 713 that is transmitted from a combination of a plurality of gears.

The sensor case 73 supports the Hall IC 18 of the rotational angle detecting device 1 that detects a rotational angle of the EGR valve 72. The magnets 11, 12 and the yoke 16 of the rotational angle detecting device 1 are housed in a gear 722. The gear 722 has a cylindrical shape and is disposed at one end of the shaft 721. Furthermore, the gear 722 is connected to the motor 713. That is, the gear 722 corresponds to the cylindrical member 10 of the electronic control throttle device 60 according to the first embodiment.

In the exhaust gas recirculation valve device 70, the IC substrate 20 has a surface on which the first and second Hall elements 21, 22 are mounted, and the surface is formed to extend along the rotational axis Ra70 of the EGR valve.

The first and second Hall elements 21, 22 are positioned between the edge surface 164 of the yoke 16 that is positioned close to the EGR valve 72 and the edge surface 165 of the yoke 16 that is positioned away from the EGR valve 72 (i.e., in the region indicated by the arrow Ap2 in FIG. 7). The first and second Hall elements 21, 22 are positioned closer to the rotational axis Ra70 in a direction perpendicular to the rotational axis Ra70 than the inner walls of the magnets 11, 12 and the yoke 16 to the rotational axis Ra70 (the area indicated by the arrow Av2 in FIG. 7). That is, the first and second Hall elements 21, 22 are positioned within the area Ar2 surrounded by the magnets 11, 12 and the yokes 16, 17 as shown in FIG. 7. Accordingly, the rotational angle detecting device 1 can obtain the same advantages as the first embodiment even when applied to the exhaust gas recirculation valve device 70.

Figure 8:
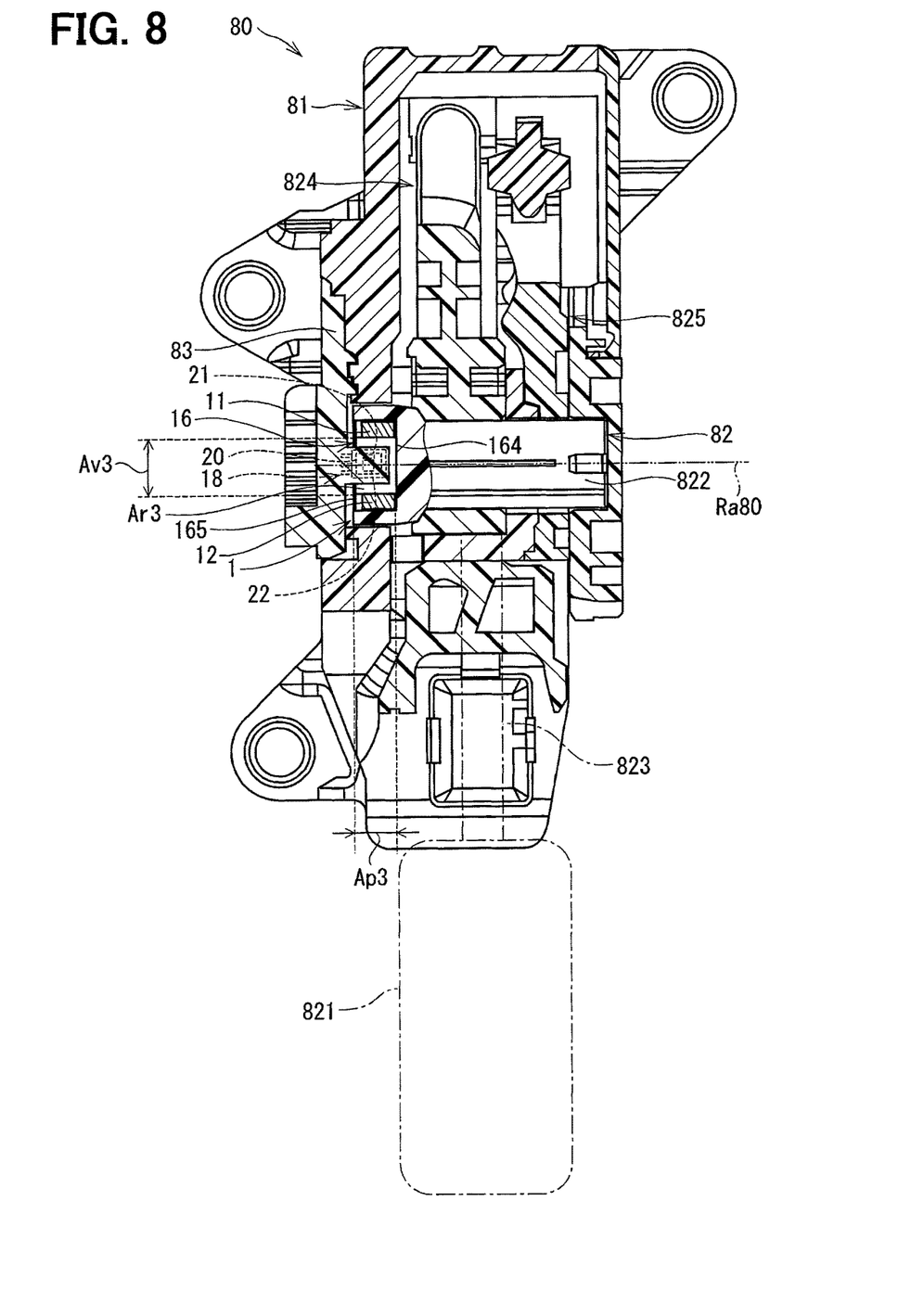
FIG. 8 is a cross-sectional view of an accelerator device in yet another embodiment to which the position detecting device according to the first embodiment is applied.

FIG. 8 shows a cross sectional view of an accelerator device to which the "position detecting device" according to the first embodiment. The accelerator device 80 shown in FIG. 8 outputs a signal according to a depressed amount of an accelerator pedal by a drive to an ECU that controls opening degree of the throttle valve. The accelerator device 80 includes a supporting member 81, an operating member 82, a sensor case 83, and the rotational angle detecting device 1.

The supporting member 81 is attached to a chassis and rotatably supports the operating member 82 housed therein.

The operating member 82 includes an accelerator pedal 821 as the "detection object" and a shaft 822. The accelerator pedal 821 is rotatable together with the shaft 822 through a pedal arm 823. The shaft 822 is rotatably disposed in the supporting member 81. A biasing member 824 and a hysteresis mechanism 825 are disposed radially outward of the shaft 822. The biasing member 824 biases the shaft 822 to rotate the accelerator pedal 821 in a closing direction. The hysteresis mechanism 825 has rotational torque applied to the accelerator pedal 821 when the accelerator pedal 821 is depressed different from rotational torque applied to the accelerator pedal 821 when the accelerator pedal 821 is released.

The sensor case 83 supports the Hall IC 18 of the rotational angle detecting device 1 that is disposed outside of the supporting member 81 and detects a rotational angle of the accelerator pedal 821. The magnets 11, 12 and the yoke 16 of the rotational angle detecting device 1 are disposed at one end of the shaft 822. In other words, the one end of the shaft 822 corresponds to the cylindrical member 10 of the electronic control throttle device 60 as described in the first embodiment.

In the accelerator device 80, the IC substrate 20 includes a surface on which the first and second Hall elements 21, 22 are mounted, and the surface extends along the rotational axis Ra80 of the shaft 822.

The first and second Hall elements 21, 22 are positioned between the edge surface 164 of the yoke 16 that is positioned close to the hysteresis mechanism 825 in a direction along the rotational axis Ra80 and the edge surface 165 of the yoke 16 that is positioned furthest away from the hysteresis mechanism 825 in the direction along the rotational axis Ra80 (i.e., the region indicated by the arrow Ap3 in FIG. 8). The first and second Hall elements 21, 22 are positioned closer to the rotational axis Ra80 in a direction perpendicular to the rotational axis Ra80 than the inner walls of the magnets 11, 12 and the yoke 16 to the rotational axis Ra80 (the area indicated by the arrow Av3 in FIG. 8). That is, the first and second Hall elements 21, 22 are positioned within the area Ar3 surrounded by the magnets 11, 12 and the yokes 16, 17 as shown in FIG. 8. Accordingly, the rotational angle detecting device 1 can obtain the same advantages as the first embodiment even when applied to the accelerator device 80.

The rotational angle detecting device according to the above-described embodiments may be applied to, in addition to the above, a flow rate control valve device or a height sensor. When the rotational angle detecting device is applied to the flow rate control valve device or the height sensor, a rotational angle of an detection object can be detected in a broader range without deteriorating its accuracy as compared to the electronic control throttle device and the accelerator device.

In the above-described embodiments, the rotational angle detecting device calculates a rotational angle of the detection object by calculating the value of arctangent based on the first signal from the first Hall element and the second signal from the second Hall element. However, the method for calculating a rotational angle of the detection object based on the first and second signals is not necessary limited to the above method. For example, the rotational angle of the detection object may be calculated by correcting signals from two vertical Hall elements based on a signal from one lateral Hall element.

In the above-described embodiments, the calculator is disposed in the IC substrate. However, the calculator may be disposed in a member other than the IC substrate. Alternatively, the calculator may be eliminated.

In the above-described embodiments, two Hall elements are surface-mounted on the IC substrate. However, two Hall elements may be mounted on the IC substrate through a through-hole technology.

In the above-described embodiments, the second Hall element includes the magnet sensitive surface to detect a magnetic flux density in the direction as the "second direction" perpendicular to the flat surface 201. However, the "second direction" is not necessarily limited to this as long as the second direction intersects the flat surface 201.

In the above-described embodiments, the first Hall element and the second Hall element are disposed on a surface as the "one surface that has an area larger than the other surface" of the IC substrate. However, the first Hall element and the second Hall element may be disposed on the "other surface" of the IC substrate.

What is claimed is:

1. A position detecting device that detects a rotational angle of a detection object, the position detecting device comprising:
   a plurality of magnetic field generators that are rotatable together with the detection object, a rotational axis of the detection object being interposed between the plurality of magnetic field generators;
   a yoke that is rotatable together with the detection object, the yoke forming, together with the plurality of magnetic field generators, a closed magnetic circuit that intersects the rotational axis of the detection object;
   an IC substrate that has a plate shape and includes one surface, the one surface being parallel to the rotational axis;
   a first magnetic field detector that is disposed on the one surface of the IC substrate and that has a magnet sensitive surface to detect a magnetic flux density in a first direction, the first direction being parallel to the one surface and intersecting with the rotational axis, the first magnetic field detector outputting a first signal according to the magnetic flux density in the first direction; and
   a second magnetic field detector that is disposed on the one surface of the IC substrate and that has a magnet sensitive surface to detect a magnetic flux density in a second direction, the second direction being different from the first direction and intersecting with the one surface, the second magnetic field detector outputting a second signal according to the magnetic flux density in the second direction, wherein
   the first magnetic field detector and the second magnetic field detector are positioned within a region that is surrounded by the plurality of magnetic field generators and the yoke and that is between an edge surface of the plurality of magnetic field generators or the yoke close to the detection object along the rotational axis and an edge surface of the plurality of magnetic field generators or the yoke away from the detection object along the rotational axis.

2. The position detecting device according to claim 1, further comprising
   a calculator that is electrically connected to the first magnetic field detector and the second magnetic field detector, the calculator calculating a rotational angle of the detection object based on the first signal and the second signal.

3. The position detecting device according to claim 2, wherein
   the calculator calculates arctangent of the rotational angle of the detection object based on the first signal and the second signal.

4. The position detecting device according to claim 2, wherein
   the calculator is disposed in the IC substrate.

5. The position detecting device according to claim 2, further comprising
   an output terminal that outputs to an outside a rotational angle signal according to the rotational angle of the detection object calculated by the calculator, wherein
   the output terminal is configured to extend along the rotational axis.

6. The position detecting device according to claim 1, wherein
   the IC substrate is one of a plurality of IC substrates.

7. The position detecting device according to claim 6, wherein
   the first magnetic field detector is one of a plurality of first magnetic field detectors, and each of the plurality of first magnetic field detectors is disposed in a respective one of the plurality of IC substrates,
   the second magnetic field detector is one of a plurality of second magnetic field detectors, and each of the plurality of second magnetic field detectors is disposed in a respective one of the plurality of IC substrates,
   the first direction in which one of the plurality of first magnetic field detectors disposed in one of the plurality of IC substrates detects the magnetic flux density is same as the first direction in which another of the plurality of first magnetic field detectors disposed in another of the plurality of IC substrates detects the magnetic flux density, and the second direction in which one of the plurality of second magnetic field detectors disposed in the one of the plurality of IC substrates detects the magnetic flux density is same as the second direction in which another of the plurality of second magnetic field detectors disposed in the other of the plurality of IC substrates detects the magnetic flux density.

8. The position detecting device according to claim 1, wherein the first magnetic field detector and the second magnetic field detector are surface-mounted on the IC substrate.

9. The position detecting device according to claim 1, further comprising a molding resin member that seals the first magnetic field detector, the second magnetic field detector, and the IC substrate, wherein the molding resin member has a surface along the one surface that is larger than another surface of the molding resin member.

10. The position detecting device according to claim 1, wherein the detection object is a valve member included in an electronic control throttle device.

11. The position detecting device according to claim 1, wherein the detection object is a valve member included in a exhaust gas recirculation valve device.

12. The position detecting device according to claim 1, wherein the detection object is an accelerator pedal included in an accelerator device.

13. The position detecting device according to claim 1, wherein the one surface has a surface area that is larger than surface areas of other surfaces of the IC substrate.

14. The position detecting device according to claim 1, wherein the first direction is perpendicular to the rotational axis.

* * * * *